United States Patent
Navot et al.

(10) Patent No.: US 10,287,015 B1
(45) Date of Patent: May 14, 2019

(54) ITEM DELIVERY WITH AN AERIAL VEHICLE

(71) Applicant: Amazon Technologies, Inc., Seattle, WA (US)

(72) Inventors: Amir Navot, Seattle, WA (US); Elad Ben-Israel, London (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/822,005

(22) Filed: Nov. 24, 2017

Related U.S. Application Data

(62) Division of application No. 14/623,465, filed on Feb. 16, 2015, now Pat. No. 9,828,092.

(51) Int. Cl.
*B64C 39/02* (2006.01)
*G06Q 10/08* (2012.01)
*G01C 21/20* (2006.01)

(52) U.S. Cl.
CPC .......... *B64C 39/024* (2013.01); *G01C 21/20* (2013.01); *G06Q 10/08355* (2013.01); *B64C 2201/024* (2013.01); *B64C 2201/108* (2013.01); *B64C 2201/128* (2013.01); *B64C 2201/14* (2013.01)

(58) Field of Classification Search
CPC .......... B64C 39/024; B64C 2201/14; B64C 2201/141; B64C 2201/145; B64C 2201/126; B64C 2201/128; G06Q 10/0832; G06Q 10/08355
See application file for complete search history.

(56) References Cited

U.S. PATENT DOCUMENTS

| | | | |
|---|---|---|---|
| 9,244,147 B1* | 1/2016 | Soundararajan | G01S 1/44 |
| 2014/0254896 A1* | 9/2014 | Zhou | B25J 9/0006 |
| | | | 382/124 |
| 2016/0107750 A1* | 4/2016 | Yates | B64C 39/024 |
| | | | 244/2 |
| 2016/0200438 A1* | 7/2016 | Bokeno | B64C 39/024 |
| | | | 244/2 |

* cited by examiner

*Primary Examiner* — Brian M O'Hara
(74) *Attorney, Agent, or Firm* — Athorus, PLLC

(57) ABSTRACT

Described is a system and method for utilizing unmanned aerial vehicles ("UAV") to facilitate delivery of ordered items to user specified delivery destinations. In one implementation, the UAV may be configured as a one-way UAV that is designed to transport ordered items to the user specified delivery destination but not return to a materials handling facility under its own power. Instead, the one-way UAV may remain at the delivery destination for later retrieval by a retrieval unit (e.g., truck).

20 Claims, 6 Drawing Sheets

ITEM DELIVERY WITH AN AERIAL VEHICLE

CROSS-REFERENCE TO RELATED APPLICATIONS

This application is a divisional of U.S. patent application Ser. No. 14/623,465, filed Feb. 16, 2015, the contents of which are incorporated by reference herein in their entirety.

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by customers. This inventory may be maintained and processed at a building including a materials handling facility. Such materials handling facilities may include, but are not limited to, one or more of: warehouses, distribution centers, cross-docking facilities, order fulfillment facilities, packaging facilities, shipping facilities, or other facilities or combinations of facilities for performing one or more functions of material (inventory) handling.

Typically ordered items are packed in shipping packages (e.g., corrugated boxes) and shipped to the customer's residence or place of business. Physical delivery of items to user specified delivery destinations has improved dramatically over the years, with some retailers offering next day delivery of ordered items. The final, or last mile delivery of physical items to a user specified delivery destination, is traditionally accomplished using a human controlled truck, bicycle, cart, etc. For example, a user may order an item for delivery to their home. The item may be picked from a materials handling facility, packed, and shipped to the customer for final delivery by a shipping carrier. The shipping carrier will load the item onto a truck that is driven by a human to the final delivery destination and the human driver, or another human companion with the driver, will retrieve the item from the truck and complete the delivery to the destination. For example, the human may hand the item to a recipient, place the item on the user's porch, store the item in a post office box, etc.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
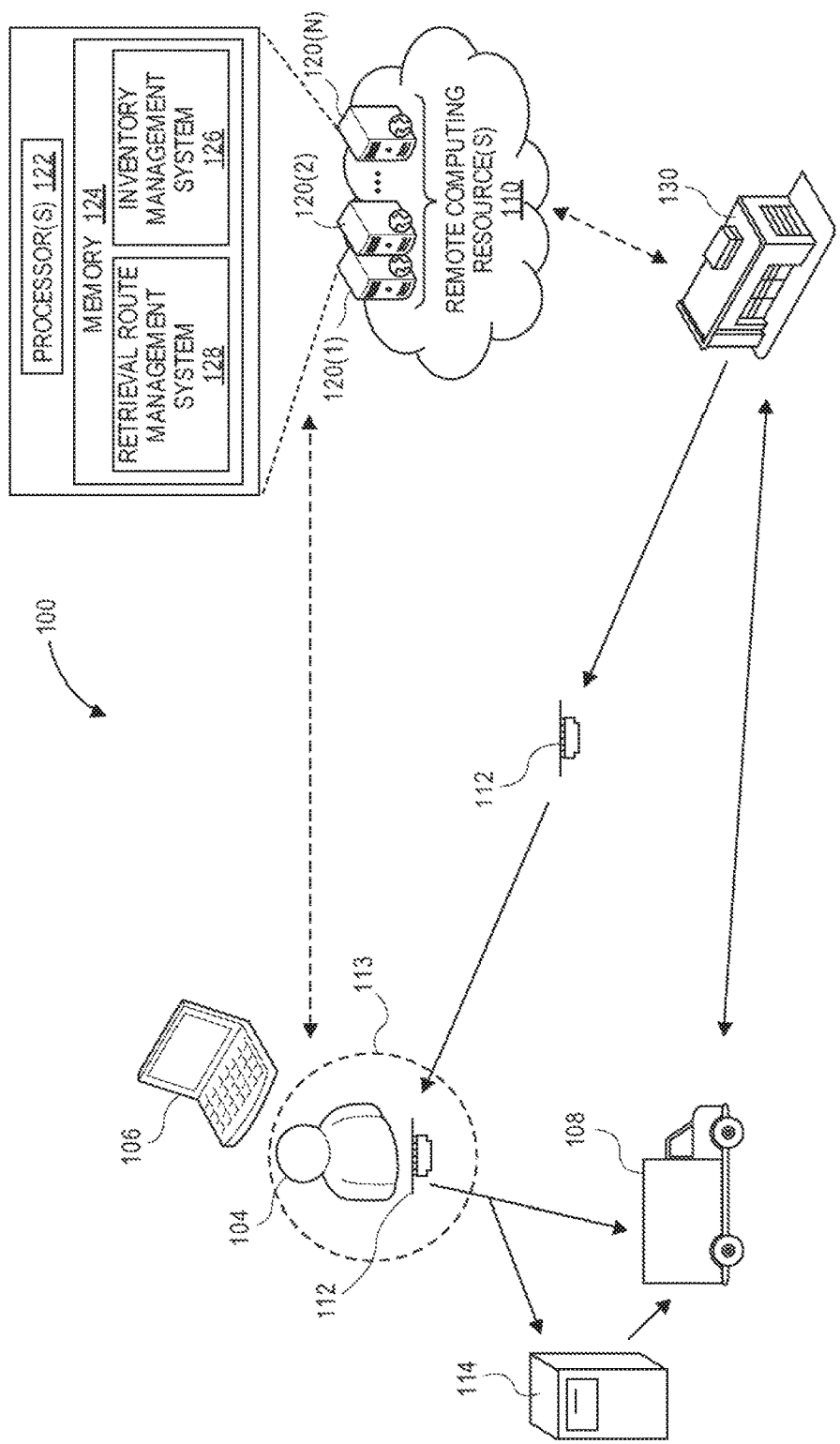
FIG. 1 is a block diagram of a delivery environment that utilizes one-way unmanned aerial vehicles for item delivery, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and methods for utilizing unmanned aerial vehicles ("UAV") to facilitate delivery of ordered items to user specified delivery destinations. In one implementation, the UAV may be configured as a one-way UAV that is designed to transport ordered items to the user specified delivery destination but not return to a materials handling facility under its own power. Instead, the one-way UAV may remain at the delivery destination for later retrieval by a retrieval unit (e.g., truck). In other implementations, the one-way UAV may not be returned. For example, the one-way UAV may be disposable, part of the item delivered to the user, and/or made of recyclable material.

In some implementations, the one-way UAV may be configured as a small, low cost UAV that is designed to transport only small, lightweight items. For example, the one-way UAV may be configured to only be capable of carrying a payload having a weight of approximately one pound or less (referred to herein as carrying weight). By reducing the carrying weight of the one-way UAV, the total weight of the one-way UAV may likewise be smaller. For example, the frame of the one-way UAV, motors, propellers, etc., may be smaller. By reducing the carrying weight and total weight of the one-way UAV, the power supply necessary to power the one-way UAV, etc., may likewise be smaller, further reducing the total weight of the one-way UAV. Likewise, in some implementations, the one-way UAV may be utilized in a system in which the one-way UAV only has power sufficient to enable aerial navigation from the materials handling facility to the user specified delivery destination, thereby further reducing the power requirements and overall weight of the one-way UAV.

By reducing the size and weight of the one-way UAV and the carrying capacity of the one-way UAV, the cost to manufacture the one-way UAV and the potential damage to objects if impacted by the one-way UAV is likewise reduced. For example, if the one-way UAV is landing at a delivery destination and impacts an object, the smaller form factor of the one-way UAV, and thus the smaller propeller blades, will cause little to no damage to the impacted object.

After a one-way UAV completes a delivery to a user specified delivery destination, the one-way UAV may become inoperable and/or emit a beacon indicating that it is to be retrieved by a retrieval unit. A retrieval unit, such as a ground based vehicle (e.g., car, truck, bus), may navigate a retrieval route and retrieve one or more one-way UAVs and/or other items along the retrieval route. Once the one-way UAVs are retrieved by the retrieval unit, the retrieval unit may return the one-way UAVs to the materials handling facility, or another location, and the one-way UAVs may be utilized to transport another ordered item to another delivery destination.

FIG. 1 is a block diagram of a delivery environment 100 that includes a one-way UAV 112 and a retrieval unit 108, according to an implementation. The delivery environment 100 includes a user interface that allows a user 104 to place an order for an item that is to be delivered to the user. The user interface may be a graphical user interface, an audio only interface, a multi-mode interface, or any other interface for interacting with the user 104. The user interface may be provided to the user 104 through any type of electronic device 106, such as a tablet, desktop, laptop, smart phone, personal digital assistant, netbook, etc. The user interface may be delivered to the electronic device 106 by one or more remote computing resources 110 that make up part or all of an electronic-commerce (e-commerce) shopping environment. In other implementations, the user interface may provide a direct communication between a user and an agent.

The remote computing resources 110 may form a portion of a network-accessible computing platform implemented as a computing infrastructure of processors, storage, software, data access, and other components that is maintained and accessible via a network. Services, such as e-commerce shopping services, offered by the remote computing resources 110 do not require that the user have knowledge of the physical location and configuration of the system that delivers the services. The electronic device 106 may communicatively couple to the remote computing resources 110 via the network which may represent wired technologies (e.g., wires, USB, fiber optic cable, etc.), wireless technologies (e.g., RF, cellular, satellite, Bluetooth, etc.), and/or other connection technologies. The network carries data between the electronic device 106 and the remote computing resources 110.

After receiving from a user 104 an order for an item, the electronic device 106 may send this information to the remote computing resources 110 over the network. As illustrated, the remote computing resources 110 may include one or more servers, such as servers 120(1), 120(2) . . . 120(N). These servers 120(1)-(N) may be arranged in any number of ways, such as server farms, stacks, and the like that are commonly used in data centers. Furthermore, the servers 120(1)-(N) may include one or more processors 122 and memory 124 that may store an inventory management system 126 and/or a retrieval route management system 128.

The inventory management system 126 may be configured, for example, to perform order planning and fulfillment of the order from materials handling facility 130 using a one-way UAV 112 and/or by traditional delivery mechanism (e.g., vehicles). The memory 124 of the remote computing resources 110 may also include a retrieval route management system 128 configured to plan retrieval routes for retrieval of one-way UAVs 112. The inventory management system 126 may communicate with the retrieval route management system 128 providing, for example, location information of delivery destinations and delivery times identifying the location and time when one-way UAVs will complete a delivery of an item at a user specified delivery destination. In some implementations, the one-way UAV 112 may also communicate with the retrieval route management system 128 to inform the retrieval route management system 128 that the one-way UAV is to be retrieved. For example, the one-way UAV 112 may emit a beacon upon delivery completion that includes a one-way UAV identifier and a location of the one-way UAV (e.g., global positioning coordinates).

In some implementations, rather than the UAV being retrieved by a retrieval unit from the delivery destination, the user 104 may place the one-way UAV in a UAV retrieval container 114. For example, UAV retrieval containers 114 may be positioned at convenient locations (e.g., parking lots, office buildings, public places). The retrieval route management system 128 may send a request, such as an electronic mail (e-mail), short message (SMS), and multimedia message (MMS) to the user 104 requesting that the user 104 place the one-way UAV 112 in a UAV retrieval container 114. Because of the small form factor of the one-way UAV 112, as discussed further below with respect to FIG. 2, the user may easily carry the one-way UAV 112 with them and place the one-way UAV 112 into a UAV retrieval container 114.

In still other implementations, rather than requiring a retrieval unit to navigate to and retrieve the one-way UAV 112, the user 104 may send the one-way UAV 112 to a return address using traditional transportation techniques (e.g., traditional ground based shipping carriers). For example, included in the one-way UAV 112 with the ordered item may be a pre-addressed, pre-paid, shipping pouch or bag into which the one-way UAV 112 may be placed for return shipping to the materials handling facility 130, or another location.

In still other implementations, the one-way UAV may have sufficient power to travel from the delivery destination to another location (e.g., another delivery destination, a designated retrieval location, back to the materials handling facility). For example, in some implementations, there may be designated retrieval locations and the one-way UAVs may be configured to travel under their owner power from the materials handling facility to the delivery destination, deliver the item, and then travel under their own power from the delivery destination to a retrieval location. The retrieval location may be, for example, another materials handling facility, a rooftop or other structure on which one-way UAVs may land, etc. If the retrieval location is not the materials handling facility, the retrieval management system 128 may plan a retrieval route that includes retrieval of the one-way UAVs from the retrieval location.

In still another implementation, the one-way UAVs may not be returned to the materials handling facility. For example, the one-way UAVs may be disposable. In some implementations, all or part of the one-way UAV may be manufactured from materials that are recyclable, biodegradable, etc. In still another example, all or part of the one-way UAV may be part or all of the ordered item. For example, as discussed below, the memory and/or the power module (e.g., battery) of the one-way UAV may be the ordered item.

Returning to FIG. 1, when the UAV 112 has completed delivery of the item to the delivery destination 113, the retrieval management system 128 may plan a retrieval route that is navigated by a retrieval unit 108 to retrieve the one-way UAV from a retrieval location. The retrieval location may be the delivery destination 113, a return container 114, or another location from which the one-way UAV 112 is to be retrieved. In some implementations, the retrieval management system may plan a retrieval route for the retrieval unit 108 that includes retrieval of multiple one-way UAVs 112 and/or retrieval of other items. For example, inventory to be added to the materials handling facility 130, items being returned by users, items being shipped by users, and/or any other item (generally referred to herein as other items, or another item) that may be retrieved by the retrieval unit 108, may be included as part of the retrieval route planned for the retrieval unit 108. In some implementations, the retrieval route may include delivery of other items. For example, the retrieval route may include locations to which items carried by the retrieval unit are to be delivered.

In some implementations, the user may communicate with the remote computing system 110 and identify when they will place the one-way UAV 112 at a retrieval location for retrieval by the retrieval unit 108. For example, after the user ordered item has been delivered, the retrieval management system may plan one or more retrieval routes that include retrieval of the one-way UAV and send a message to the user 104 providing options as to when the user would like the one-way UAV 112 retrieved. For example, the retrieval management system 128 may plan multiple retrieval routes, each including a retrieval of the one-way UAV 112 from a retrieval location at different times and request that the user select a preferred time for the retrieval of the one-way UAV 112. Upon selection of a preferred time, the retrieval location may be added to the retrieval route for retrieval by the retrieval unit 108. In some implementations, prior to the retrieval unit 108 arriving at the retrieval location, the retrieval management system 128 may send a message to the user 104 reminding the user that the retrieval unit 108 will be arriving to retrieve the one-way UAV 112.

As the retrieval unit 108 retrieves the one-way UAVs and/or other items, the one-way UAVs 112 may be placed into the retrieval unit and transported by the retrieval unit back to the materials handling facility 130, to another materials handling facility and/or to another location. In some implementations, in addition to transporting the one-way UAVs, the retrieval unit may also be configured to recharge the power modules of the one-way UAVs 112 as the retrieval unit 108 is transporting the one-way UAVs 112. For example, the retrieval unit may include multiple charging stations (not shown) and, when a one-way UAV 112 is retrieved from a retrieval location, the one-way UAV 112 may be connected to the charging station and the power module of the one-way UAV 112 may be recharged as it is transported by the retrieval unit 108. By charging the one-way UAVs 112 as they are being transported from a retrieval location back to the materials handling facility 130, or another location, the one-way UAVs 112 may be ready for subsequent deployment by the inventory management system 126 to deliver another item soon after they are returned to the materials handling facility 130. In other implementations, when the one-way UAVs are returned to the materials handling facility 130, or another location, they may be recharged (or recharging completed) and/or repaired before they are utilized to transport another item from the materials handling facility 130.

Figure 2:
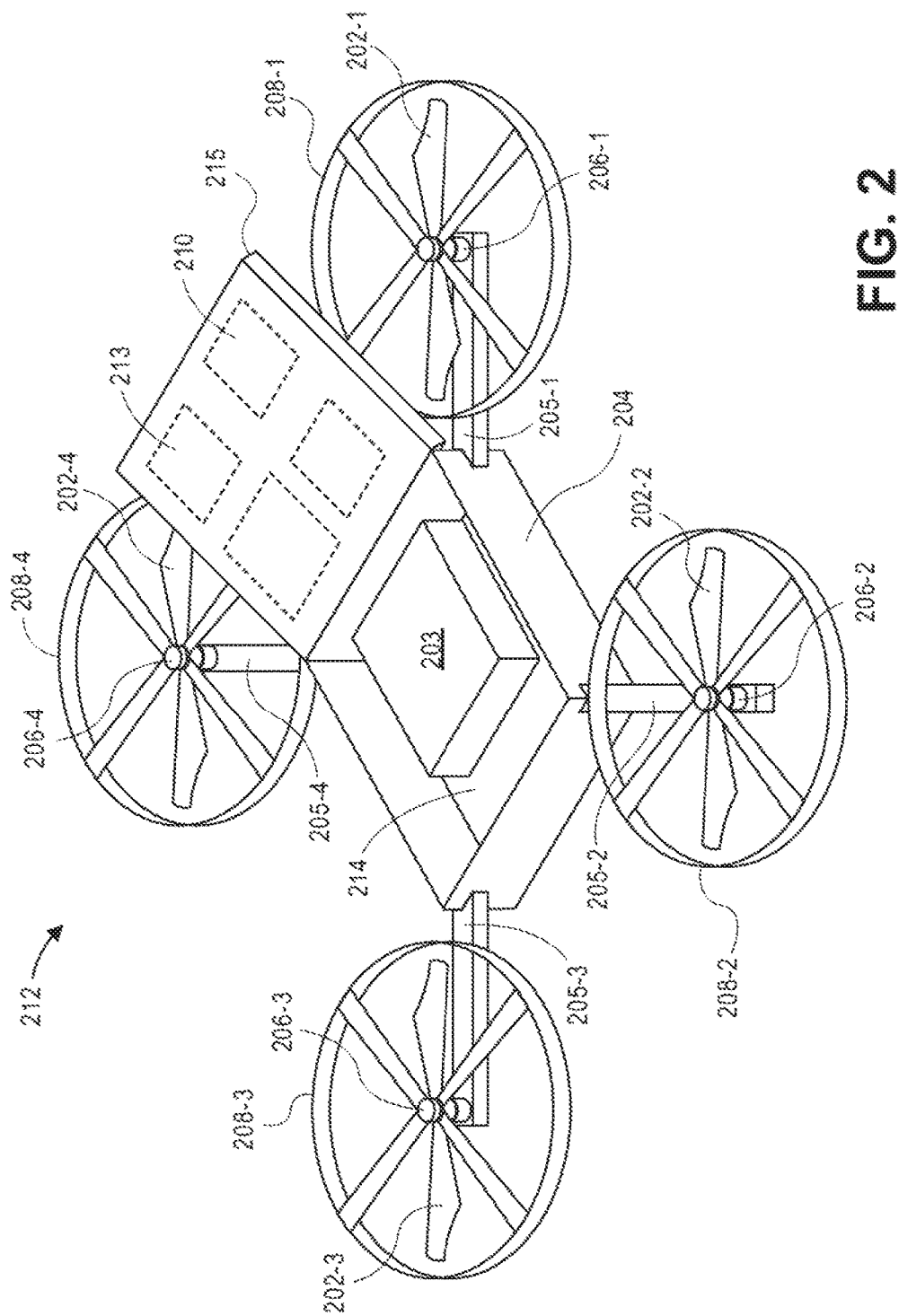
FIG. 2 is an illustration of a one-way unmanned aerial vehicle, according to an implementation.

FIG. 2 illustrates a block diagram of a top-down view of a one-way UAV 212, according to an implementation. The one-way UAV 212 may be designed to be low cost, have a small form factor and limited components, thereby reducing cost of the one-way UAV, power requirements to aerially navigate the one-way UAV and reduced or eliminated potential damage if the one-way UAV impacts an object. For example, the one-way UAV 212 may be designed to include only components necessary to achieve flight and navigate to a delivery destination. Likewise, if the one-way UAV 212 is configured to carry a payload 203 up to approximately one pound, the length and width of the one-way UAV 212 may be equal to or less than twelve inches and have a weight of approximately five pounds. In other implementations, the dimensions and/or weight may be greater or less than those illustrated.

As illustrated, the one-way UAV 212 includes four propellers 202-1, 202-2, 202-3, 202-4 spaced about the frame 204 of the one-way UAV 212. The propellers 202 may be any form of propeller (e.g., graphite, carbon fiber, plastic) and of a size sufficient to lift the UAV 212 and any item carried by or coupled to the one-way UAV 212 so that the UAV 212 can navigate through the air, for example, to deliver an item. In some implementations, the propellers 202 may be formed of a soft, or semi-soft material, such as a closed-cell extruded polystyrene foam (e.g., Styrofoam®). In other implementations, the propellers may be formed of biodegradable and/or recyclable materials, such as cardboard, compostable plastic, or the like.

In some implementations, the propellers 202 may be of a size sufficient to lift the one-way UAV 212 and a payload 203 having a weight of up to approximately one pound (carrying weight). In other implementations, the carrying weight of the one-way UAV 212 may be greater or less than approximately one pound. While this example includes four propellers, in other implementations, more or fewer propellers may be utilized. Likewise, in some implementations, the propellers may be positioned at different locations on the one-way UAV 212. In addition, alternative methods of propulsion may be utilized. For example, fans, jets, turbojets, turbo fans, jet engines, and the like may be used to propel the one-way UAV 212.

The frame 204 or body of the UAV 212 may likewise be of any suitable material, such as graphite, carbon fiber, plastic, and/or aluminum. Likewise, in some implementations, the frame 204, or parts thereof, may be formed using biodegradable and/or recyclable materials.

In this example, the frame 204 of the UAV 212 includes a payload container 214 and four motor arms 205-1, 205-2, 205-3, 205-4, or beams extending from the payload container. The payload container 214 is configured to receive or couple with a payload 203, such as an ordered item. In this example, the payload container 214 is configured as a cavity having four sides and a base into which a payload 203 may be placed. In other implementations, the payload container may have other configurations to hold, couple, or otherwise carry the payload 203. In some implementations, the payload container 214 may not be part of the one-way UAV but may be attached or coupled with the one-way UAV to transport the item. For example, motor arms 205-1 and 205-3 may be a single motor arm and motor arms 205-2 and 205-4 may be single motor arm. In such an implementation, the two motor arms may cross or join near a center of the frame 204 of the one-way UAV. The payload container 214 may be mounted onto or underneath the motor arms to enable transport of the payload 203. In some implementations, the payload container may not be utilized and the payload 203 may be coupled directly to the frame 204 of the one-way UAV 212.

In still other implementations, the original or item packaging of the ordered item may include all or part of the UAV 212. For example, rather than coupling an ordered item to a one-way UAV, the item packaging of the item may include all or part of a one-way UAV. In such an implementation, when an item is ordered, the item package of the item itself may receive navigation instructions to navigate to a delivery destination. If the item packaging of the item includes all the components of the one-way UAV, aerial transport and delivery of the item can be completed without the use of a separate one-way UAV. In other implementations, the item packaging of the item may include portions of a one-way UAV, such as the power module 213 and/or control system 210. Attachment points may exist on the item packaging to which motor arms 205 that include motors 206 and propellers 202 may be attached to complete a one-way UAV so that the item can be aerially transported to the delivery destination.

In some implementations, the one-way UAV may be configured for aerodynamics. For example, the payload container 214 may include a lid 215 that is coupled to the payload container 214 at a pivot point to enable access to items placed in the payload container 214. The lid 215 may have an aerodynamic shape that encloses the cavity of the payload container 214. Likewise, the lid 215 may include some or all of the control system 210, power module(s) 213, etc. The payload container 214 and/or the lid 215 may be made of any suitable material(s) such as graphite, carbon fiber, plastic, aluminum, etc.

In some implementations, the one-way UAV 212 may include one or more memory receivers (not shown) configured to receive a memory module, such as a universal serial bus (USB) drive, compact flash memory module, secure digital (SD) card, micro-SD cart, and/or other memory modules. In some implementations, the memory receiver may be incorporated into the payload container 214 and/or into the lid 215.

The memory module may include navigation instructions that are utilized by the one-way UAV 212 for navigation from the materials handling facility to a delivery destination. For example, the navigation instructions may specify delivery destination coordinates, desired altitude for aerial navigation, desired speed, etc. When the memory module is inserted into the memory receiver of the one-way UAV 212, the one-way UAV 212 may utilize the navigation instructions included on the memory module to navigate to the delivery destination. In some implementations, as discussed further below with respect to FIG. 5, the one-way UAV 212 may not receive and/or utilize any additional instructions for completing the aerial navigation to the delivery destination.

In some implementations, the memory module may be the ordered item. For example, a user may order a memory module for delivery. The inventory management system, as part of fulfillment of the order, may generate and store navigation instructions on the ordered memory module and the ordered memory module may be inserted into the memory receiver of the one-way UAV 212 to provide the navigation instructions to the one-way UAV. In such an implementation, when navigation to the delivery destination is complete, the one-way UAV 212 may cause the navigation instructions to be removed from the memory module before the memory module is removed from the memory receiver. For example, the one-way UAV 212 may delete the navigation instructions, format the memory module, etc., when it completes delivery of the item to the delivery destination.

The motor arms 205 are all approximately the same length and each one extends from a respective corner of the payload container 214. In other implementations, motor arms may be of different lengths and/or positioned at different locations on the one-way UAV 212.

The propellers 202 and corresponding motors 206-1, 206-2, 206-3, and 206-4 are positioned at the ends of each motor arm 205. The motors 206 may be any form of motor capable of generating enough speed with the attached propeller 202 to lift the one-way UAV 212 and any included payload 203 thereby enabling aerial transport of the payload 203. Similar to the lifting propellers 202, in some implementations, the lifting motors may be selected such that they provide enough rotational speed to generate a force from the propellers that is sufficient to lift the one-way UAV 212 and the payload 203 having a weight of up to approximately one pound.

Surrounding each propeller 202 is a safety barrier 208-1, 208-2, 208-3, and 208-4. In this example, a safety barrier is positioned around each propeller 202. In other implementations, a single safety barrier may be positioned around the entire one-way UAV 212 in such a manner that the motors and propellers 202 are within the perimeter of the safety barrier 208. The safety barrier may be plastic, rubber, etc.

In this example, the one-way UAV control system 210 is incorporated into the lid 215 of the payload container 214 of the one-way UAV 212. In other implementations, one or more components of the control system 210 may be located at other positions on the one-way UAV. The UAV control system 210, as discussed in further detail below with respect to FIG. 5, controls the operation, routing, navigation, etc., of the one-way UAV 212.

The one-way UAV 212 also includes one or more power modules 213. In this example, the power module 213 is likewise incorporated into the lid 215 of the payload container 214 of the one-way UAV 212. In other implementations, the power module 213 may be positioned elsewhere on the one-way UAV 212 and/or may be removably mounted to the one-way UAV 212. The power module 213 for the one-way UAV 212 may be in the form of battery power, solar power, gas power, super capacitor, fuel cell, alternative power generation source, or a combination thereof. In implementations in which the one-way UAV 212 has a small form factor and is configured to carry a payload of up to approximately one pound, the power module may be a small lithium-ion polymer battery, polymer lithium ion (Li-poly, Li-Pol, LiPo, LIP, PLI, or Lip) battery, a rechargeable alkaline battery, or the like, that will enable aerial transport by the one-way UAV 212 of a payload of approximately one pound a defined distance at a defined speed and a defined altitude. For example, the power module may be of a size sufficient to enable aerial transport of up to forty miles by the one-way UAV 212 of a payload of up to approximately one pound. In some implementations, the power module 213 may be the ordered item. For example, a user may order a rechargeable battery for delivery to a delivery destination. The ordered item (rechargeable battery) may be coupled to the one-way UAV and used to power the one-way UAV to the delivery destination. The user may then remove the ordered item from the one-way UAV upon delivery.

The power module(s) 213 are coupled to and provide power for the one-way UAV control system 210 and the propeller motors 206. In some implementations, one or more of the power modules may be configured such that it can be autonomously removed and/or replaced with another power module while the one-way UAV is landed (e.g., such power modules may be provided or replaced while the one-way UAV is landed in a retrieval unit). In some implementations, when the one-way UAV is within a retrieval unit, the one-way UAV may engage with a charging member to recharge the power module.

While the implementations of the one-way UAV discussed herein utilize propellers to achieve and maintain flight, in other implementations, the one-way UAV may be configured in other manners. In one implementation, the one-way UAV may include fixed wings and/or a combination of both propellers and fixed wings.

In some implementations, multiple different configurations of one-way UAV may be utilized. For example, different one-way UAV configurations may be available to transport different sizes, shapes, and/or weights of items, and/or to transport items different distances from the materials handling facility. For example, one one-way UAV configuration may be designed to aerially transport an item having an item weight of no more than eight ounces a distance of no more than twenty-five miles from the materials handling facility. A second one-way UAV may be configured to transport an item having an item weight of no more than one pound a distance of no more than twenty-five miles from the materials handling facility. A third one-way UAV may be configured to transport an item having an item weight of no more than eight ounces a distance of no more than forty miles from the materials handling facility. Based on the different item weights and distances to be traveled, the size, weight, and power requirements of the one-way UAV may vary.

Figure 3:
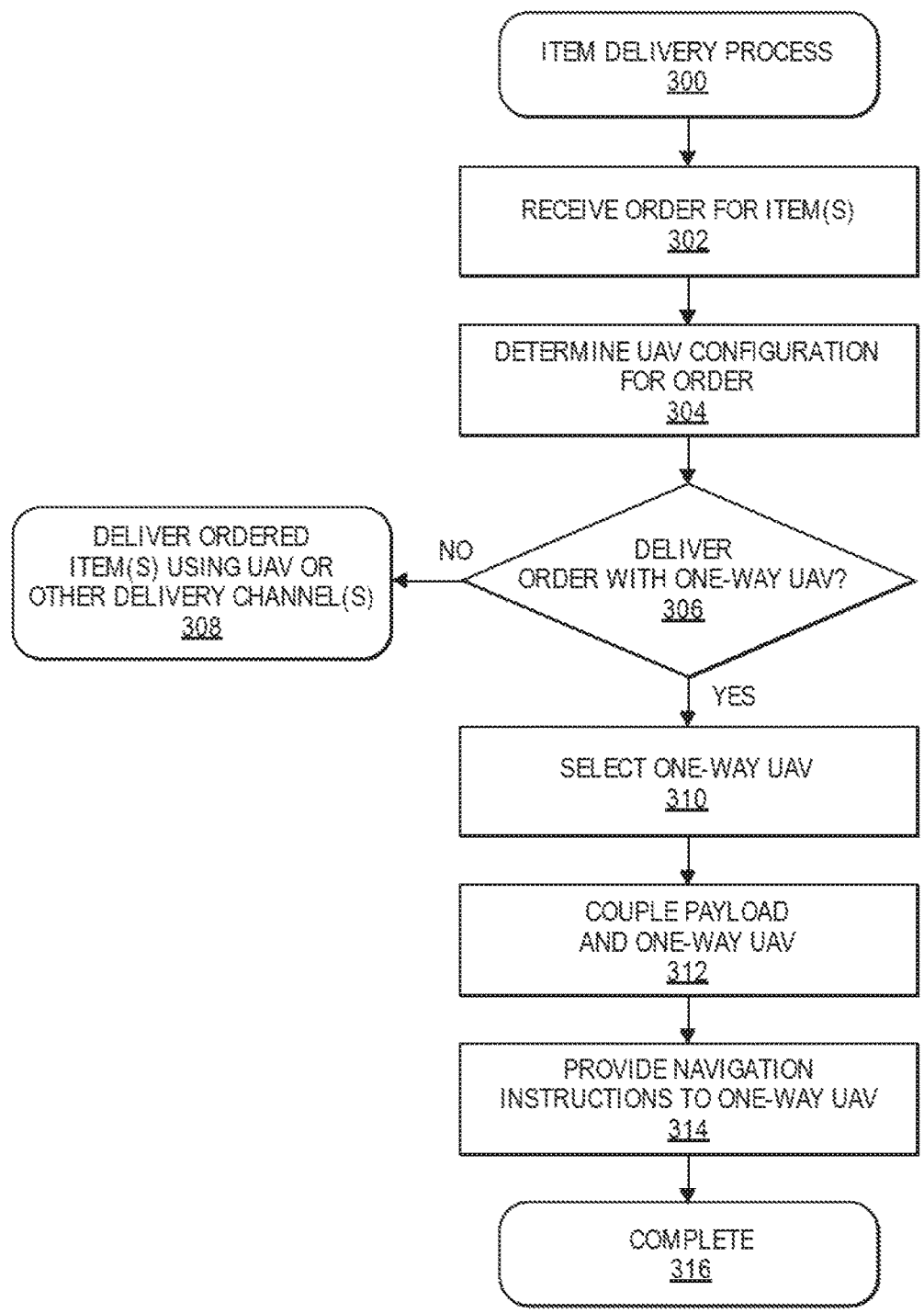
FIG. 3 is a flow diagram of an example item delivery process, according to an implementation.

FIG. 3 is a flow diagram illustrating an example item delivery process 300, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 300 begins upon receiving an order for an item, as in 302. For example, a user may interact with an e-commerce system and place an order for an item available for sale via the e-commerce system. The order for the item may identify the item, the delivery destination, and/or the materials handling facility from which the item is to be delivered. For example, when a user places an order for an item, the user may also specify a delivery destination to which the item is to be delivered. Likewise, the inventory management system may determine a materials handling facility that maintains an inventory of the item and specify the materials handling facility as the location from which the item is to be transported.

Upon receiving the order for the item, a UAV configuration necessary for aerial transport of the item from the materials handling facility to the delivery destination is determined, as in 304. For example, the example process 300 may determine a size and/or weight of the ordered item, the distance between the materials handling facility and the delivery destination, current and/or anticipated weather conditions between the materials handling facility and the delivery destination, etc. Based on this information, the example process 300 may determine the required lifting capacity and estimated power necessary for a UAV to aerially transport the item from the materials handling facility to the delivery destination.

Based on the determined UAV configuration for the ordered item, a determination is made as to whether the item can be delivered using a one-way UAV, as in 306. For example, if the determined UAV configuration specifies that the required carrying capacity of the UAV is greater than the carrying capacity of the one-way UAVs (e.g., one pound), it is determined that the item cannot be delivered using a one-way UAV. Likewise, if the UAV configuration specifies that the power required to aerially transport the item from the materials handling facility to the delivery destination exceeds the available power of the one-way UAVs, it is determined that the item cannot be delivered using a one-way UAV. Other factors beyond carrying capacity and power may also be considered in determining if the item can be delivered using a one-way UAV. For example, if the weather conditions (e.g., wind) between the materials handling facility and the delivery destination exceed what can be withstood by the one-way UAV, it may be determined that the one-way UAV cannot be utilized to deliver the item.

If it is determined that the item cannot be delivered using a one-way UAV, the item is delivered using other forms of transport, as in 308. For example, the item may be delivered using a larger UAV that can deliver the item and return to the materials handling facility, or another location, under its own power. Alternatively, the item may be delivered using other delivery channels, such as ground-based delivery.

If it is determined that the item can be delivered using a one-way UAV, a one-way UAV that satisfies the determined UAV configuration is selected for use, as in 310. For example, as discussed above, multiple one-way UAV configurations (different sizes and/or power capabilities) may be available for delivery of items. Likewise, different one-way UAV configurations may include different sizes, shapes, and/or types of payload containers for use in carrying ordered items.

Upon selection of a one-way UAV, the ordered item (payload) and the one-way UAV are coupled together, as in 312. Coupling of the payload and the one-way UAV may include, for example, placement of the payload into the payload container of the one-way UAV, inserting the payload into a memory receiver, attaching the payload to the one-way UAV with straps, or other forms of coupling the payload to the one-way UAV. As will be appreciated, any form of coupling, joining, pairing, etc., of the one-way UAV with the payload such that the one-way UAV can aerially transport the payload may be considered herein as coupling the payload to the one-way UAV.

Navigation instructions are also provided to the one-way UAV that instruct the UAV to aerially navigate from the materials handling facility to the delivery destination, as in 314. The navigation instructions may include, for example, the coordinates of the delivery destination, the desired altitude for aerial transport, the desired speed for transport, etc. In some implementations, the navigation instructions may include a flight path that is to be followed by the one-way UAV as part of the delivery. In other implementations, the one-way UAV may generate and follow a flight path based on the information provided in the navigation instructions.

In some implementations, the one-way UAV may aerially transport the payload from the materials handling facility to a delivery destination using the navigation instructions and without receiving any additional instructions. In other implementations, the one-way UAV may be configured to communicate with and/or receive information from other UAVs, the materials handling facility, the delivery destination, and/or other sources that may be utilized in the navigation to the delivery destination. For example, the one-way UAV may receive information from other UAVs identifying obstacles, weather, or other information that the one-way UAV may utilize in navigating to the delivery destination. In some implementations, navigation instructions may be provided to the one-way UAV while the one-way UAV is navigating to the delivery destination. For example, the inventory management system 126 may transmit navigation instructions to the one-way UAV while the one-way UAV is navigating to the delivery destination. Transmission may be performed using any type of wireless network, such as satellite, cellular, Wi-Fi, etc. In some implementations, the inventory management system may transmit navigation instructions that include a UAV identifier identifying the UAV that is to receive and use the navigation instructions. Those navigation instructions may be sent to a first UAV and that first UAV may forward or transmit those instructions to a second UAV. This process may continue until the intended UAV, such as the one-way UAV receives the instructions.

In such an implementation, the computing capabilities of the one-way UAV may be further reduced. Rather than receiving navigation instructions and requiring the one-way UAV to determine and follow those navigation instructions, the one-way UAV may receive individual navigation instructions, such as increase/decrease altitude, alter speed and/or orientation, etc., and execute those commands. In some implementations, the one-way UAV may not include any navigation components. For example, the one-way UAV may include an imaging component (e.g., camera) that captures images of an area (e.g., earth) near the one-way UAV and transmits those images to the inventory management system. The inventory management system may process the images to determine an approximate location, altitude, heading, speed, etc. of the one-way UAV. For example, the inventory management system may maintain images of the earth at known locations. Images received from the one-way UAV may be compared to the known images to determine the approximate location, altitude, heading, speed, etc. of the one-way UAV. Based on the determined approximate location, altitude, heading, speed, etc., the inventory management system may determine and send navigation instructions to the one-way UAV.

Upon instructing the one-way UAV to navigate to the delivery destination, the example process 300 completes, as in 316.

Figure 4:
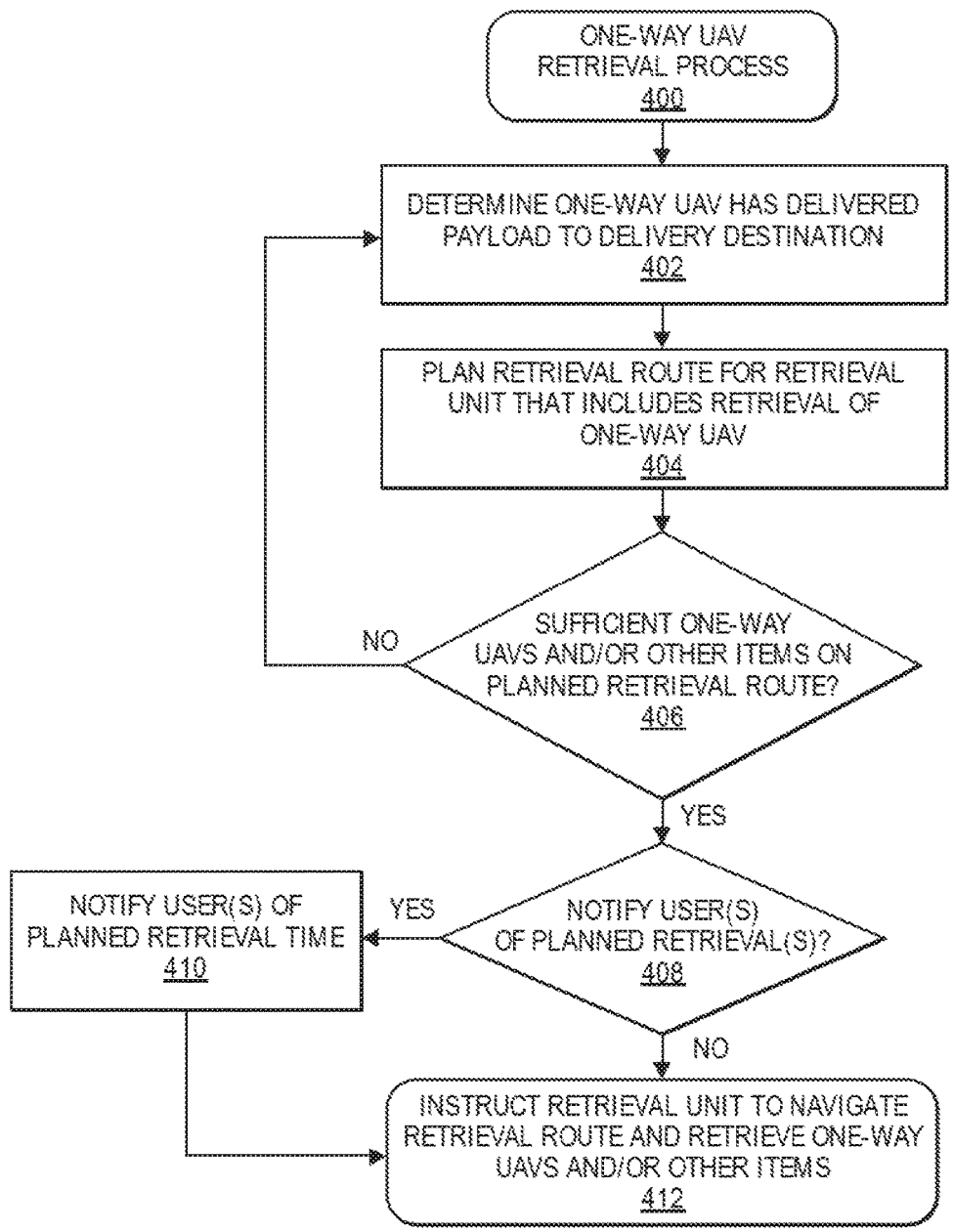
FIG. 4 is a flow diagram of an example one-way unmanned aerial vehicle retrieval process, according to an implementation.

FIG. 4 is a flow diagram of a one-way UAV retrieval process 400, according to an implementation. The example process 400 begins by determining that a one-way UAV has completed delivery of its payload to a delivery destination, as in 402. For example, when the one-way UAV lands at a delivery destination, it may emit a signal or beacon confirming that the one-way UAV has landed at the delivery destination. For example, the beacon may identify the one-way UAV and the location of the one-way UAV. In other examples, the beacon may not be transmitted until the payload container of the UAV is opened by the user and/or the payload otherwise retrieved from the one-way UAV. In still another example, the user may communicate with the inventory management system to confirm that the item has been delivered. For example, as the one-way UAV is navigating to the delivery destination, the inventory management system may send a message to the user that the ordered item is in route and will soon be delivered to the delivery destination. The message may also request that the user confirm when the item has been delivered. Upon receiving a user confirmation, it may be determined that the item has been delivered.

In still another example, the message to the user may request that the user specify when they would like to have the one-way UAV retrieved. When the inventory management system receives a selection from the user as to when the one-way UAV is to be retrieved, it may be determined that the item has been delivered. In such an example, it may be assumed that the item has been delivered unless another notification is received from the user indicating that the item has not been delivered.

In still another example, item delivery may be assumed to occur at an estimated delivery time planned for the item delivery, unless a notification is subsequently received that the item was not delivered.

Upon determining that an item has or will be delivered, one or more retrieval routes may be planned for a retrieval unit that includes retrieval of the one-way UAV, as in 404. A retrieval route may include multiple retrieval locations from which one-way UAVs and/or other items are to be retrieved by the retrieval unit. For example, if multiple one-way UAVs are used to deliver items to different delivery destinations within a defined distance of one another, the retrieval route may be planned that routes a retrieval unit to each of the delivery destinations, referred to as retrieval locations with respect to FIG. 4, for retrieval of the one-way UAVs. Likewise, if one or more users within the defined distance are returning, shipping, or otherwise have indicated that an item is to be retrieved, the retrieval location of those items may also be included in the retrieval route.

As the retrieval route is planned, it may be determined if a sufficient number of one-way UAVs and/or other items are scheduled for the retrieval route, as in 406. If it is determined that there are not sufficient one-way UAVs and/or other items planned for the retrieval route, the example process 400 returns to block 402 and continues until a sufficient number of one-way UAVs and/or other items are planned for the retrieval route. It may be determined that a sufficient number of one-way UAVs and/or other items are planned for the retrieval route if, for example, the retrieval unit will be full once the one-way UAV and/or other items are retrieved or delivered, if all or a defined amount of the one-way UAVs in the defined distance within a defined period of time are planned for retrieval, etc.

If it is determined that a sufficient number of one-way UAVs and/or other items are planned for retrieval along the retrieval route or a sufficient number of other items are planned for delivery along the retrieval route, a determination is made as to whether the user(s) are to be notified of the planned retrieval(s), as in 408. For example, if the user is to place the one-way UAV at a specific retrieval location (e.g., on their porch, near the street, etc.) to facilitate retrieval without disrupting the user, it may be determined that the user is to be notified of the planned retrieval.

If it is determined that the user(s) are to be notified of the planned retrieval, a message is sent to each user that is to be notified identifying the approximate time of the planned retrieval and requesting that the user place the one-way UAV at a location to facilitate retrieval of the one-way UAV, as in 410. For example, the user may receive an e-mail, SMS, MMS, and/or other message informing them of the planned retrieval day and/or time and request that they place the one-way UAV at a location to facilitate retrieval.

Upon notifying the user(s) of the planned retrieval and/or if it is determined that user notification is not to be provided, the retrieval unit is instructed to navigate the retrieval route and retrieve the one-way UAV(s) and/or other item(s), as in 412. For example, if the retrieval unit is a ground-based vehicle, such as a truck, the retrieval route may specify the streets that are to be navigated by the transportation unit and the retrieval locations from which the one-way UAVs and/or other items are to be retrieved. If the retrieval unit is an aerial retrieval unit, such as a larger UAV, the retrieval instructions may include navigation instructions, such as altitude, speed, and/or retrieval location coordinates that are utilized by the UAV to retrieve the one-way UAV(s) and/or other item(s).

Figure 5:
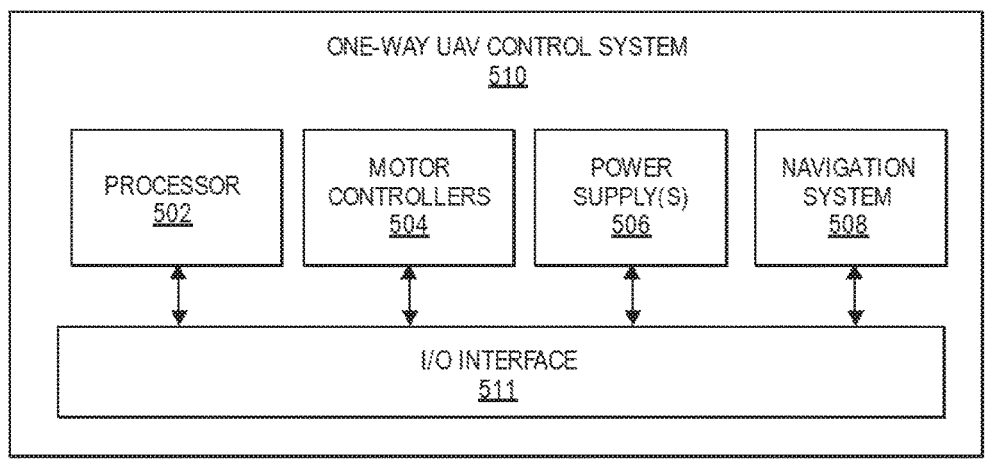
FIG. 5 is a block diagram of an example one-way unmanned aerial vehicle control system, according to an implementation.

FIG. 5 is a block diagram illustrating an example one-way UAV control system 510 that may be utilized with any of the one-way UAVs discussed herein, such as the one-way UAV 212 of FIG. 2. In various examples, the block diagram may be illustrative of one or more aspects of the one-way UAV control system 510 that may be used to implement the various systems and methods discussed herein and/or to control operation of the one-way UAV. In the illustrated implementation, the one-way UAV control system 510 includes a processor 502, motor controllers 504, such as electronic speed controls (ESCs), a power supply module(s) 506 and/or a navigation system 508 coupled via an input/output (I/O) interface 511. The one-way UAV control system 510 may also include other components such as a camera, a memory, e.g., a non-transitory computer readable storage medium, etc. In some implementations, the memory may be removable from the one-way UAV. When the memory is inserted into a memory receiver of the one-way UAV, it may be utilized as the memory for the one-way UAV control system 510 and include operating instructions that are executed by the processor 502. The memory may include navigation instructions for use in causing the one-way UAV to navigate from a materials handling facility to a delivery destination.

In some implementations, the one-way UAV control system may also include a deactivation component configured to disable operability of the one-way UAV when the one-way UAV completes aerial navigation to the delivery destination. For example, the deactivation component may include a switch that disconnects the power module from the one-way UAV control system and/or the motors, thereby disabling operability of the one-way UAV. In some implementations, the deactivation component may deactivate the one-way UAV when the navigation instructions are completed, and/or when the one-way UAV lands at the delivery destination.

The processor 502 may be any suitable processor capable of executing instructions. For example, in various implementations, the processor 502 may be a general-purpose or embedded processor implementing any of a variety of instruction set architectures (ISAs).

The memory may be configured to store executable instructions, data, navigation instructions, and/or other data accessible by the processor 502. As discussed above, the memory may be part of the one-way UAV control system 510 and/or removably coupled to the one-way UAV control system 510. The memory may be implemented using any suitable memory technology, such as static random access memory (SRAM), synchronous dynamic RAM (SDRAM), nonvolatile/Flash-type memory, or any other type of memory.

In one implementation, the I/O interface 511 may be configured to coordinate I/O traffic between the processor(s) 502, the motor controllers 504, the navigation system 508, and/or other components of the one-way UAV. In some implementations, the I/O interface 511 may perform any necessary protocol, timing or other data transformations to convert data signals from one component (e.g., memory) into a format suitable for use by another component (e.g., processor 502). In some implementations, the I/O interface 511 may include support for devices attached through various types of peripheral buses, such as a variant of the Peripheral Component Interconnect (PCI) bus standard or the Universal Serial Bus (USB) standard, for example.

The motor controllers 504 communicate with the navigation system 508 and adjust the rotational speed of each motor to stabilize the UAV and guide the UAV to enable aerial navigation of the one-way UAV. The navigation system 508 may include a global positioning system (GPS), indoor positioning system (IPS), or other similar system and/or sensors that can be used to navigate the UAV from a materials handling facility to a delivery destination.

In some implementations, the UAV may not include a navigation system 508 or the navigation system may have decreased functionality. For example, rather than including GPS, IPS or other similar system, the navigation system 508 may only receive navigation instructions from the inventory management system and send control commands to the motor controllers 504 to execute the navigation instructions received from the inventory management system. In such an example, the UAV may include a receiver (not shown) that is capable of receiving transmissions from the inventory management system. Likewise, the UAV may include a transmitter that is capable of transmitting information to the inventory management system. For example, the UAV may include an image capture device (e.g., camera) that obtains images or video of the area surrounding the UAV and transmits those images/video to the inventory management system. The inventory management system may utilized the transmitted images to determine the location of the UAV and generate navigation instructions. For example, the inventory management system may compare received images with images at known locations in the approximate area of the UAV to determine the location, altitude, heading, speed, etc. of the UAV. Based on the determined information, the inventory management system is capable of generating and transmitting navigation instructions to the UAV that are executed by the UAV for navigation.

Those skilled in the art will appreciate that the UAV control system 510 is merely illustrative and is not intended to limit the scope of the present disclosure. In particular, the control system may include any combination of hardware or software that can perform the indicated functions. The UAV control system 510 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Figure 6:
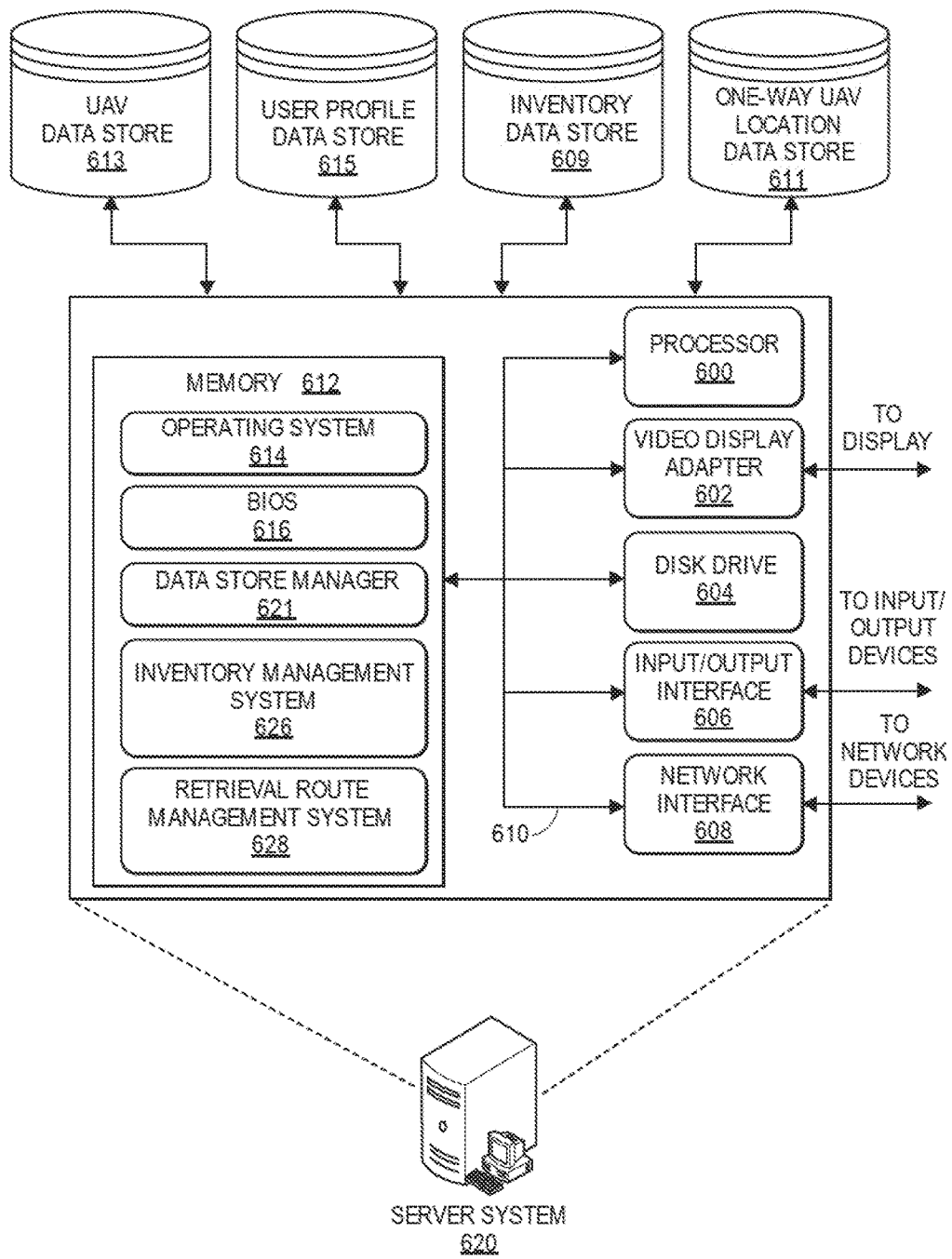
FIG. 6 is a block diagram of an illustrative implementation of a server system that may be used with various implementations.

FIG. 6 is a pictorial diagram of an illustrative implementation of a server system 620 that may be used in the implementations described herein. The server system 620 may include a processor 600, such as one or more redundant processors, a video display adapter 602, a disk drive 604, an input/output interface 606, a network interface 608, and a memory 612. The processor 600, the video display adapter 602, the disk drive 604, the input/output interface 606, the network interface 608, and/or the memory 612 may be communicatively coupled to each other by a communication bus 610.

The video display adapter 602 provides display signals to a display (not shown in FIG. 6) permitting an agent of the server system 620 to monitor and configure operation of the server system 620 and/or to provide information (e.g., regarding one-way UAV locations, utilization and/or retrieval plans). The input/output interface 606 likewise communicates with external input/output devices not shown in FIG. 6, such as a mouse, keyboard, scanner, or other input and output devices that can be operated by an agent of the server system 620. The network interface 608 includes hardware, software, or any combination thereof, to communicate with other computing devices. For example, the network interface 608 may be configured to provide communications between the server system 620 and other computing devices, such as that of a materials handling facility, delivery destination, retrieval container, etc., via a network.

The memory 612 generally comprises random access memory (RAM), read-only memory (ROM), flash memory, and/or other volatile or permanent memory. The memory 612 is shown storing an operating system 614 for controlling the operation of the server system 620. A binary input/output system (BIOS) 616 for controlling the low-level operation of the server system 620 is also stored in the memory 612.

The memory 612 additionally stores program code and data for providing network services to the materials handling facility, inventory management system 626, and/or retrieval route management system 628. The program instructions enable communication with a data store manager application 621 to facilitate data exchange between the data stores 609, 611, 613, 615, the inventory management system 626 and the retrieval route management system 628.

As used herein, the term "data store" refers to any device or combination of devices capable of storing, accessing, and retrieving data, which may include any combination and number of data servers, databases, data storage devices and data storage media, in any standard, distributed or clustered environment. The server system 620 can include any appropriate hardware and software for integrating with the data stores 609, 611, 613, and 615 as needed to execute aspects of one or more applications for a materials handling facility, the inventory management system 626, and/or the retrieval route management system 628.

The data stores 609, 611, 613, 615 can include several separate data tables, databases or other data storage mechanisms and media for storing data relating to a particular aspect. For example, the inventory data store 609 includes mechanisms for maintaining information related to item inventory maintained by one or more materials handling facilities. Item inventory information may include, among other information, the quantity, size, shape, price, weight, and/or other information regarding inventory maintained in the materials handling facility.

The one-way UAV location data store 611 may maintain location information for one-way UAVs that may be utilized by the inventory management system 626 to plan item delivery of inventory items to delivery destinations and/or used by the retrieval route management system for scheduling retrieval of one-way UAVs.

The UAV data store 613 may maintain information relating to one-way UAV configurations, carrying capacity, flight duration, power supply, etc. The information maintained in the UAV data store may be utilized by the inventory management system in determining if a one-way UAV may be utilized to transport an item from a materials handling facility to a delivery destination and/or to select a one-way UAV for item delivery.

The user profile data store 615 maintains information relating to users. For example, the user profile data store 615 may include delivery destinations selected by users, user purchase history, user preferences (e.g. notification preferences), whether the user desires to have one-way UAVs retrieved from a retrieval location, whether the user will provide the one-way UAV to a retrieval container and/or whether the user prefers to send the one-way UAV back to a materials handling facility, or other location, using traditional transportation carriers, and the like. The inventory management system 626 may utilize the user profile information to plan item delivery and/or communicate with the user. The retrieval route management system may utilize the user profile information from the user profile data store to plan retrieval of the one-way UAVs.

It should be understood that there might be additional aspects that can be stored in one or more of the data stores 609, 611, 613, 615 and that additional or fewer data stores beyond the ones illustrated may be included. The data stores 609, 611, 613, 615 are operable, through logic associated therewith, to receive instructions from the server system 620 and obtain, update or otherwise process data in response thereto.

The memory 612 may also include the inventory management system 626 and the retrieval route management system 628, discussed above. The inventory management system 626 and/or the retrieval route management system 628 may be executable by the processor 600 to implement one or more of the functions of the server system 620. In one implementation, the inventory management system 626 and/or the retrieval route management system may represent instructions embodied in one or more software programs stored in the memory 612. In another implementation, the inventory management system 626 can represent hardware, software instructions, or a combination thereof.

The server system 620, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction in FIG. 6 should be taken as being illustrative in nature and not limiting to the scope of the disclosure.

Those skilled in the art will appreciate that in some implementations the functionality provided by the processes and systems discussed above may be provided in alternative ways, such as being split among more software modules or processes or consolidated into fewer modules or processes. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners.

The various processes and systems as illustrated in the figures and described herein represent example implementations. The processes and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. An aerial vehicle, comprising:
a payload container;
a plurality of propellers, each propeller coupled to one of a plurality of motors;
a power module coupled to the payload container and to the plurality of motors, wherein the power module is configured to provide power to the plurality of motors to aerially transport an item from a materials handling facility to a delivery destination;
a deactivation component configured to disable operability of the aerial vehicle responsive to completion of aerial navigation to the delivery destination; and
wherein at least a portion of the aerial vehicle is manufactured from a material that is recyclable or biodegradable.

2. The aerial vehicle of claim 1, wherein the item weighs less than one pound.

3. The aerial vehicle of claim 1, further comprising:
a memory receiver configured to receive a memory module that includes navigation instructions; and
wherein the item is the memory module and the memory module includes navigation instructions for aerially navigating the aerial vehicle from the materials handling facility to the delivery destination.

4. The aerial vehicle of claim 3, wherein the aerial vehicle is configured to follow the navigation instructions to aerially navigate from the materials handling facility to the delivery destination, without receiving additional instructions.

5. The aerial vehicle of claim 3, wherein the navigation instructions are configured to be removed from memory module before the memory module is removed from the memory receiver of the aerial vehicle.

6. The aerial vehicle of claim 1, wherein:
the item is configured to be ordered, via an electronic commerce system, by a user;
the delivery destination is specified by the user;
the payload container is a cavity having four sides and a base; and
the payload container is configured to at least receive the item.

7. The aerial vehicle of claim 1, wherein the power module is configured to provide power that is sufficient to enable aerial transport of the item only from the materials handling facility to the delivery destination and not back to the materials handling facility from the delivery destination.

8. The aerial vehicle of claim 1, wherein the aerial vehicle is a one-way aerial vehicle that is at least one of recyclable, compostable, consumable, or disposable upon completion of an aerial transport of the item.

9. An aerial vehicle, comprising:
one or more propulsion mechanisms configured to propel the aerial vehicle;
a power module coupled to at least one of the one or more propulsion mechanisms, wherein the power module is configured to provide power to transport an item from a materials handling facility to a delivery destination;
a deactivation component configured to disable the one or more propulsion mechanisms responsive to arrival of the aerial vehicle at the delivery destination; and
a payload container that is configured to at least receive the item.

10. The aerial vehicle of claim 9, wherein:
the item is configured to be ordered, via an electronic commerce system, by a user; and
the delivery destination is specified by the user.

11. The aerial vehicle of claim 9, further comprising:
a memory receiver that is configured to receive a memory module, the memory module including navigation instructions for aerially navigating the aerial vehicle from the materials handling facility to the delivery destination; and
wherein the navigation instructions are configured to be deleted from the memory module before the memory module may be removed from the memory receiver of the aerial vehicle.

12. The aerial vehicle of claim 9, further comprising a control system that is configured to at least cause the deactivation component to disable operability of the aerial vehicle responsive to completion of navigation by the aerial vehicle to the delivery destination.

13. The aerial vehicle of claim 12, wherein the control system is further configured to at least determine that the aerial vehicle has completed aerial navigation to the delivery destination by determining that the aerial vehicle has landed at the delivery destination.

14. The aerial vehicle of claim 9, wherein the power module is configured to provide power that is sufficient to enable aerial transport of the item only from the materials handling facility to the delivery destination and not back to the materials handling facility from the delivery destination.

15. The aerial vehicle of claim 9, wherein the deactivation component includes a switch that is configured to selectively disconnect the power module from the one or more propulsion mechanisms.

16. The aerial vehicle of claim 9, further comprising:
an image capture device that is configured to capture an image of a space around the aerial vehicle; and
a communications system that is configured to at least send the image to an inventory management system.

17. An aerial vehicle, comprising:
a plurality of propulsion mechanisms configured to propel the aerial vehicle;
a power module coupled to the plurality of propulsion mechanisms, wherein the power module is configured to provide power to transport an item from a materials handling facility to a delivery destination;
a payload container that includes a lid;

a plurality of radial arms extending away from the payload container;

wherein:
the payload container is configured to at least receive the item;
the lid includes at least a portion of a control system; and
each of the propulsion mechanisms is coupled to a respective one of the radial arms; and a deactivation component configured to disable the plurality of propulsion mechanisms responsive to arrival of the aerial vehicle at the delivery destination.

18. The aerial vehicle of claim 17, wherein:
the item is configured to be ordered, via an electronic commerce system, by a user; and
the delivery destination is specified by the user.

19. The aerial vehicle of claim 17,
wherein the control system is configured to at least cause a signal to be transmitted from the aerial vehicle responsive to opening of the lid of the payload container to confirm a delivery of the item.

20. The aerial vehicle of claim 17, wherein the control system is configured to at least cause the deactivation component to disable one or more of the plurality of propulsion mechanisms responsive to completion of a navigation by the aerial vehicle to the delivery destination.

* * * * *